Patented June 15, 1937

2,084,250

UNITED STATES PATENT OFFICE 2,084,250

PROCESS FOR THE PRODUCTION OF STARCH

Albrecht Fritze, Arnswalde, Germany

No Drawing. Application January 9, 1935, Serial No. 1,065. In Germany September 7, 1934

4 Claims. (Cl. 127—66)

The process hitherto generally employed for the production of starch consisted of the following operations:—

(1) Comminution (for example by rasping) of the washed raw material, (2) Washing out and further comminution of the rasped mass, (3) Preliminary purification of the starch obtained in the washing-out apparatus in tanks, course runs, extractors, lamellators or separators, (4) Further purification of the starch-milk in vats, runs, lamellators or separators, (5) Preliminary drying of the starch in centrifugal machines, (6) Drying and sifting of the starch.

It is a known fact that the starch obtained is the better, the more rapidly its recovery proceeds.

As an example of application of the foregoing method, the production of potato-starch may be more fully described here. The potatoes comminuted in operation (1) contain a great deal of fruit-liquor as well as starch and fibre. The fruit-liquor of the potato, for example, is composed of soluble albumen, gummy-substances, amidon compounds, mineral substances and sugar. Once the potato has been comminuted, then, in air, there at once occurs a discolouration of the potato pulp due to the deleterious effect of the fruit-liquor. This discolouration makes more difficult and partly prevents this production of a good quality of starch. In order to reduce the harmful effect of the fruit-liquor, particularly of the albuminous substances, in some cases sulphurous acid and other agents have been added to the potato pulp immediately after the comminuting. However, apart from the fact that the machines suffer by reason of the addition of such agents, no complete success is achieved by this manner of working.

In operation (2), the comminuted potato pulp was next washed out in the washing-out apparatus, that is, the starch contained in the comminuted mass was washed out of the mass by water. The washing of the starch out of the mass was also rendered materially more difficult by the fruit-liquor contained in the mass. The formation of froth, which renders a good washing-out of the mass and thus a good yield very much more difficult or prevents the same, may readily be produced by the albumen contained in the fruit-liquor, particularly with potatoes which are not wholly perfect.

The starch-milk obtained in the washing-out apparatus, which, with this old process, contained almost the whole of the fruit-liquor as well as fresh water, was finally further treated as hereinbefore mentioned. The production of the starch then required about 7 to 8 hours in the most favourable case.

In order, now, effectively to combat the harmful effect of the fruit-liquor from the start, according to the invention the procedure is as follows:—

As heretofore, the potato or another raw material is first comminuted. The comminuted mass flowing away from the comminuting means, however, is then led, either in the consistency in which it is flowing away or in a more or less highly diluted condition, to a device which at once energetically separates the solid constituents contained in the ground mass from the main bulk of the fruit-liquor. Such a separation may, for example, be effected in separators (for example centrifugal separators), filters or other known and appropriately adapted separating devices. Particularly, if the flow from the comminuting means to the separating device is conducted with avoidance of any very long contact of the comminuted mass with the air, or even with complete exclusion of air, and as quickly as possible, the harmful effect, unavoidable with the hitherto usual method of procedure, of the fruit-liquor upon the starch and comminuted mass is obviated from the start.

After this separating operation, according to the new process, the mass freed from the fruit-liquor is at once re-diluted and washed out in a washing-out apparatus. Owing to the absence of the principal albuminous constituents, the washing out it now also materially facilitated and the washing-out apparatus can be made substantially smaller than has been usual. The changing of the washing screens, which were quickly fouled by the albumen hitherto contained in the mass, is is no longer so frequently necessary.

The purification of the starch-milk obtained in the washing-out apparatus may be performed in a manner similar so that hitherto usual (see above, under operations (3) and (4)). However, on account of the afore-mentioned rapid and thorough previous removal of the fruit-liquor from the mass, only a very slight further washing in accordance with operation (4), for example a single washing in vats, runs or similarly acting apparatus, is necessary with the new process, whereas hitherto at least two washings were necessary in the majority of cases.

The production of the starch according to the new process, from the comminuting to the finished starch,—e. g. in the production of potato-starch—now takes only about 3 to 3½ hours. A corresponding reduction is achieved with other raw materials, for instance, sweet potatoes, manioc, yucca, maize and so forth.

The great advantages achieved by the use of the new process reside primarily in the following points:—

(a) Better quality of starch on account of the obviation of the harmful effect of the fruit-liquor, (b) Better washing-out and consequently higher starch-yield, (c) Considerable shortening of the time of the operation and thus further improvement of the starch-quality.

(d) Simpler attendance for the plant.

I claim:

1. Process of producing starch from potatoes or other like starch-containing raw materials which produce fruit liquors upon comminution in starch manufacture, which comprises the steps of comminuting the raw material to form a pulp containing starch, fiber and fruit liquor, immediately thereafter centrifugally separating the fruit liquor from the pulp to avoid so far as possible any contact of air with the mixture of starch and fruit liquor, diluting and washing the separated pulp solids to form a starch milk, separating the starch and fiber from the dilute fruit liquor of the starch milk, and purifying the starch to free it from fiber.

2. Process of producing starch from potatoes or other like starch-containing raw materials which produce fruit liquors upon comminution in starch manufacture, which comprises the steps of comminuting the raw material to form a pulp containing starch and fruit liquor, diluting the pulp with water, immediately thereafter centrifugally separating the fruit liquor from the diluted pulp to avoid so far as possible any contact of air with the mixture of starch and fruit liquor, diluting and washing the separated pulp solids to form a starch milk, separating the starch from the diluted fruit liquor of the starch milk, and purifying the solid starch obtained by the separation.

3. Process of producing starch from potatoes or other like starch-containing raw materials which produce fruit liquors upon comminution in starch manufacture, which comprises the steps of comminuting the raw material to form a pulp containing starch and fruit liquor, diluting the pulp with water, immediately thereafter centrifugally separating the fruit liquor from the diluted pulp to avoid so far as possible any contact of air with the mixture of starch and fruit liquor, diluting and washing the separated pulp solids to form a starch milk, centrifugally separating the starch from the diluted fruit liquor of the starch milk, and purifying the solid starch obtained by the separation.

4. Process of producing starch from potatoes or other like starch-containing raw materials which produce fruit liquors upon comminution in starch manufacture, which comprises the steps of comminuting the raw material to form a pulp containing starch and fruit liquor, diluting the pulp with water, immediately thereafter centrifugally separating the fruit liquor from the diluted pulp, said comminuting, dilution and separation being effected with exclusion of air, diluting and washing the separated pulp solids to form a starch milk, centrifugally separating the starch from the diluted fruit liquor of the starch milk, and purifying the solid starch content thereof.

ALBRECHT FRITZE.